9392X
I. PHILBRICK.
COTTON DRYING.
Patented Feb. 12, 1836.
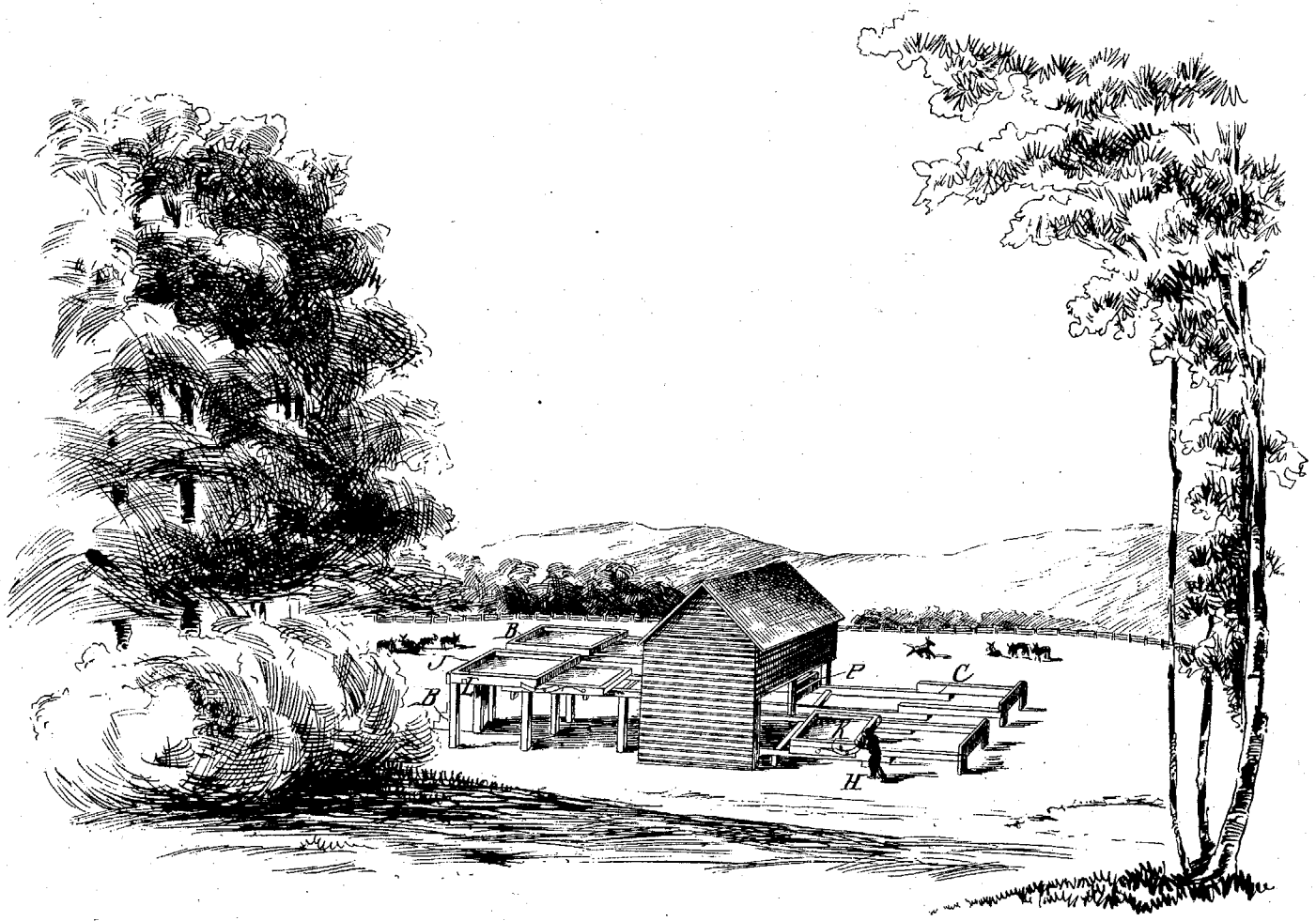
THE NORRIS PETERS CO., PHOTO-LITHO., WASHINGTON, D. C.

9392x [illegible] Feb 12, 1836

John Philbrick Wilkinson Mississippi

Letters Patent

The Schedule referred to in these Letters Patent and making part of the same
containing a description in the words of the said John Philbrick himself of his
improvement in the Apparatus for drying Cotton and other articles.

To all whom it may concern. Be it known that I John Philbrick of the County of
Wilkinson in the State of Mississippi have invented an apparatus for the drying
of Cotton after it has been picked from the plant and of a great variety of vegetables
and other Substances which require exposure to the Sun and air and by which ap
paratus they may be immediately protected from the effects of rain and [illegible], and I
do hereby declare that the following is a full and exact description thereof reference
being had to the drawing which accompanies and makes a part of this Specification.
I erect a Staging consisting of parallel rails
which are to support platforms troughs or cars upon which the cotton or other ar
ticles to be dried are to be spread. These cars or platforms may be of any convenient
dimensions but for the sake of description we will suppose them to be made four feet
wide and Eight feet long and the rails upon which they run to be six inches in
height. On the accompanying drawing one of these rails is marked by the letter
C and rises six inches to the height of the platform above the rail upon which
it reclines at its left end. P.B.K.L. are platforms troughs or cars which rest and
run upon the rails having wheels or rollers upon them made [illegible] for that purpose.
The rails upon which the platforms
rest rise one above the other in the form of steps as seen in the drawing. The plat
form marked K is represented as having passed from the right hand rail on to the
next platform having been pushed forward by the man H. and now stands upon
the platform on the next rail against which it catches, and both pass together [illegible]
the shed in the centre the pair marked P being shewn as already there.
There at the left hand of the shed are to
be slid in, in the same way when necessary and pass above the others B is a latch
catch by which the two platforms are held together or released at pleasure B [illegible]

moveable steps for conveniently reaching, charging and discharging the platforms. Although two only of such platforms are represented as extending on each side of the shed the number to be used is limited only by the convenience with which they may be managed and this is the case also with their dimensions.

The mode of managing them also well admits of being varied whilst the principle upon which they operate will remain unchanged. Thus for example the shed may be made to cover the highest platform and be itself pushed on so as to gather all the [illegible] platforms under it in its progress the platforms may be in a single row or there may be two or more rows in width two being shown in the drawing. The platforms may be run under the shed by hand or by means of a winch with a windlass and rope or otherwise. Having thus fully exemplified the general construction and use of my said apparatus I wish it to be distinctly understood that I do not intend by the example given to limit myself thereto but to vary the same in any way I may think proper whilst the purpose and is attained by analogous means. What I claim as my invention is the construction of a salt [illegible] in successive steps and having upon them [illegible] platforms upon which salt to be dried may be exposed to the sun and air and which may in a few seconds be [illegible] upon each other under a shed to protect them from the weather when necessary in the manner or upon the principle herein set forth.

Witnesses
J. H. Lewis
B. K. Mansell

John Pullbick (Patented 12 February 1836?) 768 Words

Drawing